United States Patent [19]

Shiina et al.

[11] Patent Number: 5,486,888
[45] Date of Patent: Jan. 23, 1996

[54] CAMERA

[75] Inventors: Michihiro Shiina; Jun'ichi Iwamoto; Fumio Iwai, all of Oomiya, Japan

[73] Assignee: Fuji Photo Optical Co., Ltd., Saitama, Japan

[21] Appl. No.: 242,019

[22] Filed: May 12, 1994

[30] Foreign Application Priority Data

May 14, 1993 [JP] Japan .................................. 5-113437

[51] Int. Cl.⁶ .............................. G03B 3/10; G03B 17/04
[52] U.S. Cl. ...................................... 354/187; 354/195.12
[58] Field of Search ................................ 354/187, 195.12

[56] References Cited

U.S. PATENT DOCUMENTS 4,779,964  10/1988  Ozawa et al. .
4,958,178  9/1990  Yoshida et al. .
5,231,441  7/1993  Hata .
5,307,103  4/1994  Machida .
5,398,095  3/1995  Tsukamoto et al. .

Primary Examiner—Michael L. Gellner
Assistant Examiner—Daniel G. Chapik
Attorney, Agent, or Firm—Hickman & Beyer

[57] ABSTRACT

A camera includes a lens barrel which can be retracted into a camera body, and a lens barrel storage control apparatus. The lens barrel has a front lens group mounted in a front end portion thereof and a rear lens group movably disposed therein. The lens barrel storage control apparatus, first, controls a stepping motor for driving the rear lens group to locate the rear lens group at a standby position in the barrel, and then controls a DC motor for driving the lens barrel to retract the lens barrel into the camera body while keeping the rear lens group at the standby position. Also, when it is detected that the rear lens group is not located at the standby position, the control apparatus controls the DC motor to locate the lens barrel at a suitable position within a range where the lens barrel can be set in a photographable state.

19 Claims, 8 Drawing Sheets

CAMERA

BACKGROUND OF THE INVENTION

1. Field of the Invention

The present invention relates to a so-called retractable barrel type camera which is arranged such that a lens barrel of zoom system can be retracted into a camera body, and more particularly to a control in retracting the lens barrel.

2. Related Background Art

A recent demand is to reduce the outer dimensions of camera, particularly of compact camera. Especially, an important subject is to miniaturize a lens barrel as much as possible. To miniaturize the lens barrel, a recent trend in camera having the two lens group zoom system is to replace a mechanical cam system with a mechanism for driving the front lens group and the rear lens group by separate motors.

Figure 1A:
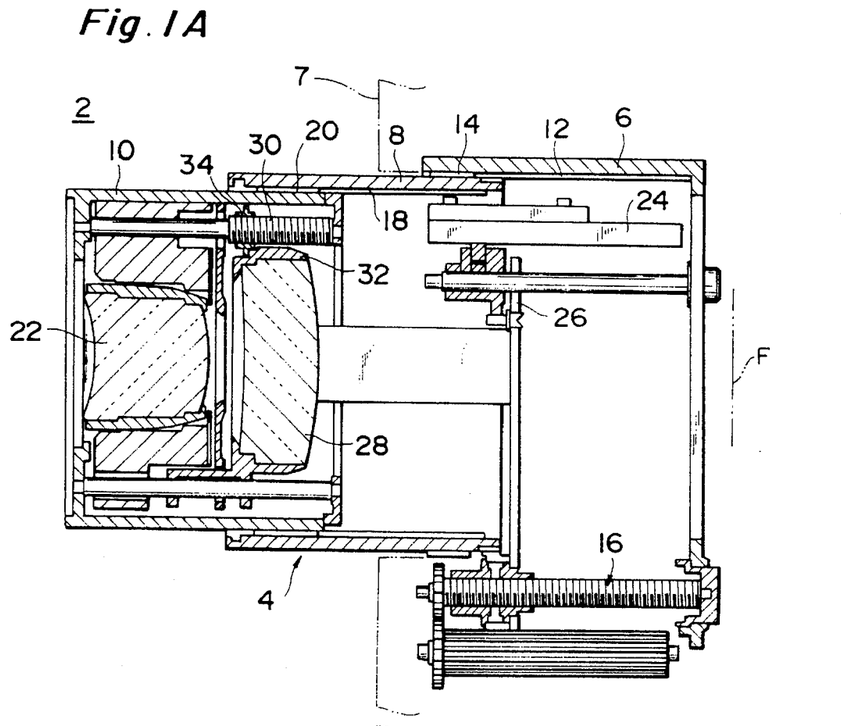
FIG. 1A is a cross sectional view to show the construction of a two lens group zoom system in a camera to which the present invention is applied, showing a state of telephoto extreme.
Figure 1B:
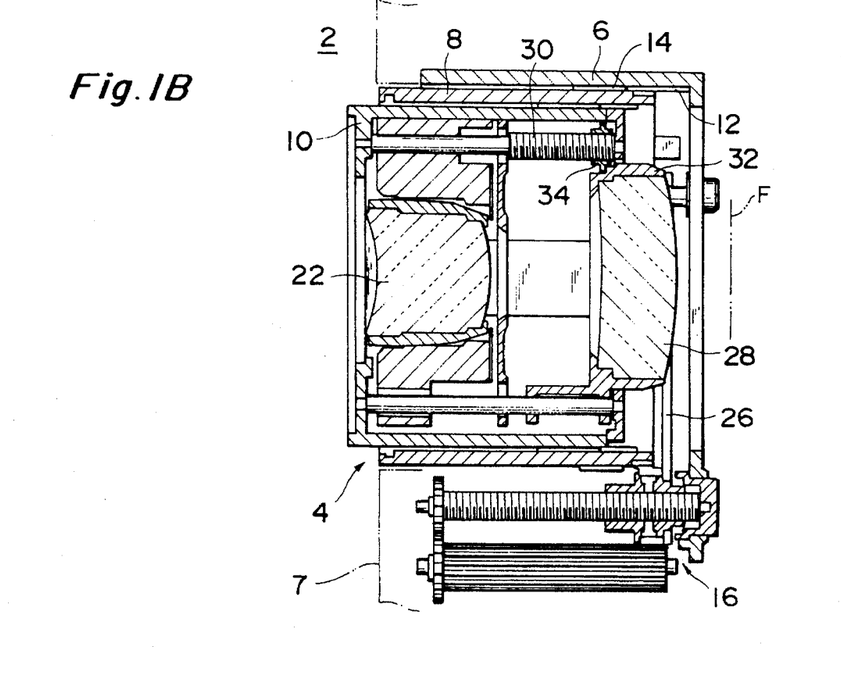
FIG. 1B is a view similar to FIG. 1A, showing a state of wide-angle extreme.

An example of the two lens group zoom system is one as shown in FIGS. 1A and 1B. A lens barrel 4 of the zoom system 2 is composed of a stationary barrel 6 forming a part of camera body, an intermediate barrel 8 telescopically stored in the stationary barrel 6, and a movable barrel 10 telescopically stored in the intermediate barrel 8.

A front lens group (FLG) 22 which consists of one or more lenses is fixed in a front end portion of the moving barrel 10 and is arranged to be driven by a direct current (DC) motor (not shown in FIGS. 1A and 1B) to move backward and forward together with the moving barrel 10.

Also, a rear lens group (RLG) 28 which consists of one or more lenses is arranged behind the front lens group 22 (on the camera body side) in the moving barrel 10 so as to be movable backward and forward. The rear lens group 28 is driven backward and forward by a stepping motor (not shown in FIGS. 1A and 1B).

FIG. 1A indicates an extreme telephoto state in which the focal length is the longest and FIG. 1B indicates an extreme wide-angle state in which the focal length is the shortest.

Such a zoom system 2 is generally so arranged that with no occasion to shoot, the moving barrel 10 and the intermediate barrel 8 are further retracted from the extreme wide-angle state as shown in FIG. 1B into the stationary barrel 6 to store the entire lens barrel 4 at a retracted position in the camera body. However, if the lens barrel 4 were moved to the retracted position with the rear lens group 28 being kept at the position of extreme wide-angle state, the rear lens group 28 would come into contact with a film F, which could damage the film F.

Thus, the conventional camera is so arranged that in retracting the lens barrel 4 into the camera body, the rear lens group 28 is first moved to a predetermined standby position where it is located closest to the front lens group 22 and thereafter the lens barrel is retracted.

However, if the rear lens group 28 fails to be located at the predetermined standby position because of some cause, the conventional two lens group zoom system as described above has a possibility that the rear lens group 28 would contact the film F when the lens barrel 2 is retracted into the camera body in that state.

Especially, in case of a motor for driving the rear lens group 28 being a stepping motor, the above point must be fully taken care of. The stepping motor could cause a step-out state in which it is not normally driven with application of pulse, if a drive voltage thereof is lowered. A position of the rear lens group is normally obtained from a cumulative number of pulses applied to the stepping motor. Therefore, once the step-out state occurs, an actual position of the rear lens group becomes lost, which could cause contact between the rear lens group and the film.

Consequently, a need exists for a way to prevent contact between the rear lens group and the film in retracting the lens barrel.

SUMMARY OF THE INVENTION

According to one aspect of the present invention, there is provided a camera designed to satisfy the aforementioned needs. The camera comprises: a camera body; a lens barrel arranged as movable backward and forward relative to the camera body; a first motor for driving the lens barrel; a front lens group coaxially mounted in a front end portion of the lens barrel; a rear lens group coaxially disposed in the lens barrel behind the front lens group so as to be independently movable backward and forward; a second motor for driving the rear lens group; and a lens barrel storage control apparatus for controlling the first motor and the second motor in storing the lens barrel at a retracted position in the camera body, the lens barrel storage control apparatus including first means for driving the second motor to locate the rear lens group at a predetermined standby position in the lens barrel, second means for detecting if the rear lens group is located at the standby position, third means for driving the first motor to retract the lens barrel to the retracted position in the camera body while keeping the rear lens group at the standby position when the second means detects that the rear lens group is located at the standby position, and fourth means for driving the first motor to locate the lens barrel at a suitable position within a range where the lens barrel can be set in a photographable state when the second means detects that the rear lens group is not located at the standby position.

Also, according to another aspect of the present invention, there is provided a lens barrel storage control method for use in a camera having a camera body, a lens barrel arranged as movable backward and forward relative to the camera body, a first motor for driving the lens barrel, a front lens group coaxially mounted in a front end portion of the lens barrel, a rear lens group coaxially disposed in the lens barrel behind the front lens group so as to be independently movable backward and forward, and a second motor for driving the rear lens group, the lens barrel storage control method comprising the steps of: driving the second motor to locate the rear lens group at a predetermined standby position in the lens barrel on starting a process for storing the lens barrel at a retracted position in the camera body; detecting if the rear lens group is located at the standby position; driving the first motor to retract the lens barrel to the retracted position in the camera body while keeping the rear lens group at the standby position, when the second means detects that the rear lens group is located at the standby position; and driving the first motor to locate the lens barrel at a suitable position within a range where the lens barrel can be set in a photographable state, when the second means detects that the rear lens group is not located at the standby position.

As described above, when it is detected that the rear lens group is located at the standby position, the lens barrel is retracted into the camera body while keeping the rear lens group at the position. On this occasion, the rear leds group will never contact the film, of course. Also, in case the rear lens group should not be located at the standby position, the position of rear lens group would be unknown. Then, the lens barrel is located at a suitable position in a photographable state without retracting the lens barrel into the camera body. The rear lens group will not contact the film as long as the lens barrel is located at the position in the photographable state, for example at the position in the extreme wide-angle state.

The present invention will become more fully understood from the detailed description given hereinbelow and the attached drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which.

DETAILED DESCRIPTION OF THE PREFERRED EMBODIMENT

Preferred embodiments of the present invention will be described in detail with reference to the drawings. A two lens group zoom system 2 in a camera to which the present invention is applied is the same as one described with FIGS. 1A and 1B, but the structure thereof will be described in more detail in order to further clarify the content of the present invention.

A lens barrel 4 of the zoom system 2 is of a three barrel arrangement composed of a stationary barrel 6 forming a part of camera body 7, an intermediate barrel 8 telescopically stored in the stationary barrel 6, and a moving barrel 10 telescopically stored in the intermediate barrel 8.

A spiral groove 12 is formed on the internal surface of the stationary barrel 6, and an engaging portion 14 provided on the outer surface of end portion of the intermediate barrel 8 is meshed with the spiral groove 12. The intermediate barrel 8 is arranged as rotatable in normal and reverse directions by a direct current (DC) motor (not shown in FIGS. 1A and 1B) through a transmission mechanism 16, so that it can extend and contract relative to the stationary barrel 6 with its rotation.

A spiral groove 18 is also formed on the internal surface of the intermediate barrel 8, and an engaging portion 20 on the outer surface of end portion of the moving barrel 10 is meshed with the spiral groove 18. The moving barrel 10 is arranged as incapable of rotating relative to the stationary barrel 6, so that it telescopically moves in the same direction as the telescopic motion of the intermediate barrel 8 when the intermediate barrel 8 is rotated. A front lens group (FLG) 22 which consists of one or more lenses is fixed in a front end portion of the moving barrel 10. Accordingly, the front lens group 22 is moved back and forth when drive of the DC motor is controlled to telescopically move the intermediate barrel 8 and the moving barrel 10. Thus, the DC motor functions as a driving motor of the front lens group 22. Numeral 24 designates a position sensor, which detects a position of a moving member 26 moving together with the intermediate barrel 8. Since a position of the front lens group 22 is uniquely determined by the position of the intermediate barrel 8, the position of the front lens group 22 can be detected from an output signal from the position sensor 24 whenever necessary.

Also, a rear lens group (RLG) 28 which consists of one or more lenses is arranged behind the front lens group 22 (on the camera body side) within the moving barrel 10 so as to be movable backward and forward. Although nor shown in FIGS. 1A and 1B, a two-phase stepping motor is set as the rear lens group driving motor inside the moving barrel 10, and a female screw member 34 integral with a lens frame 32 for the rear lens group 28 is in mesh with a feed screw 30 connected to a rotation shaft of the stepping motor. Accordingly, the rear lens group 28 moves backward and forward by controlling the drive of the stepping motor.

A home position (reference position) of the rear lens group 28 is a position where the rear lens group 28 is closest to the front lens group 22, and there is a home position sensor (not shown in FIGS. 1A and 1B) provided in the moving barrel 10 to detect if the rear lens group 28 is located at the home position. A position of the rear lens group 28 is calculated from a cumulative pulse number of stepping motor driven from the home position. Although various types of home position sensors can be employed in the present invention, the present embodiment employs a limit switch, which is turned on when the rear lens group 28 is located at the home position.

Figure 2:
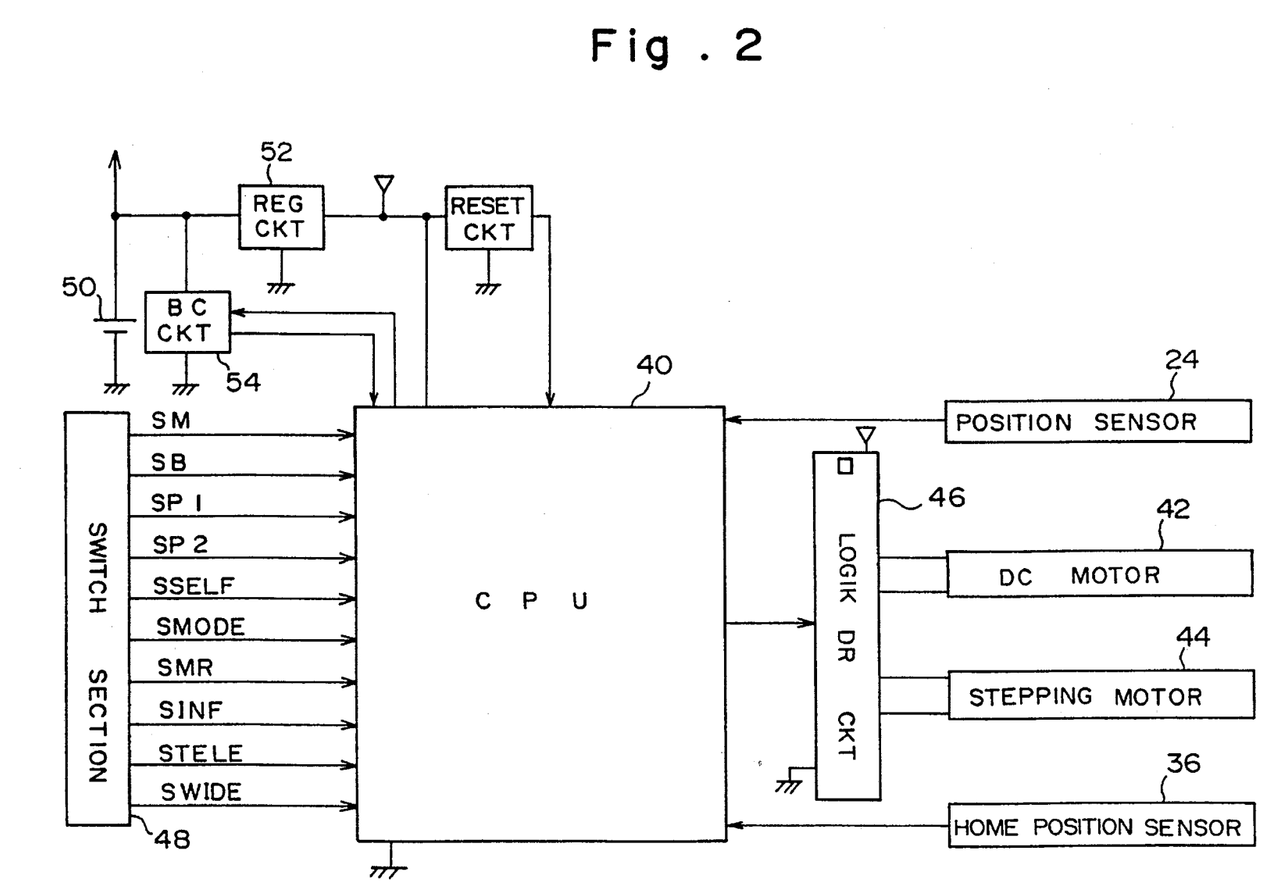
FIG. 2 is a block diagram to show a one-chip type microcomputer or CPU constituting a lens barrel storage control apparatus according to the present invention.
Figure 3A:
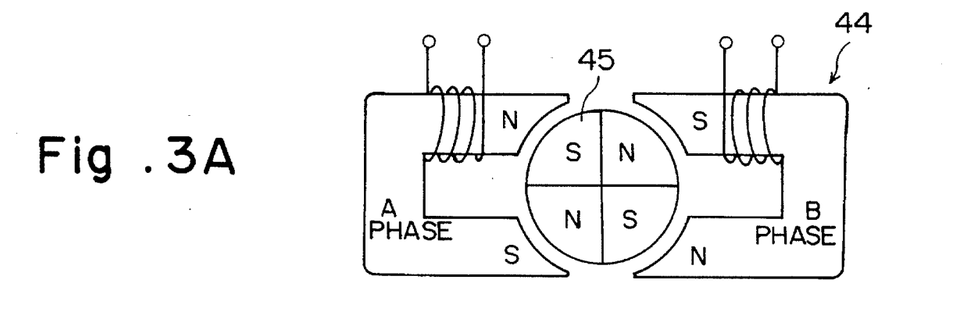
FIGS. 3A to 3D are conceptual drawings to show the structure and operation of a stepping motor for driving a rear lens group in zoom system, respectively.
Figure 3B:
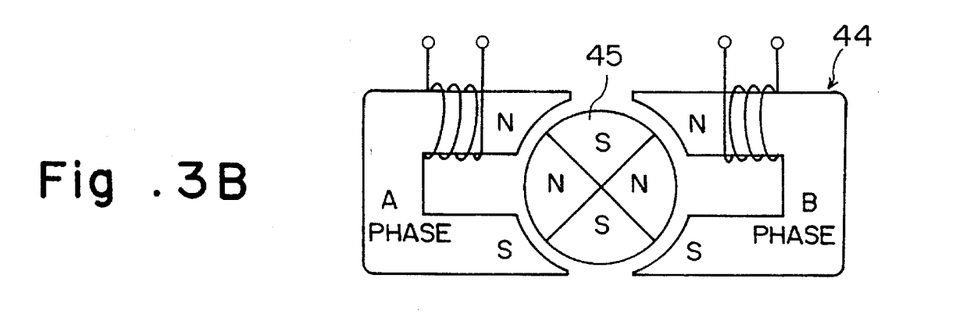
Figure 3C:
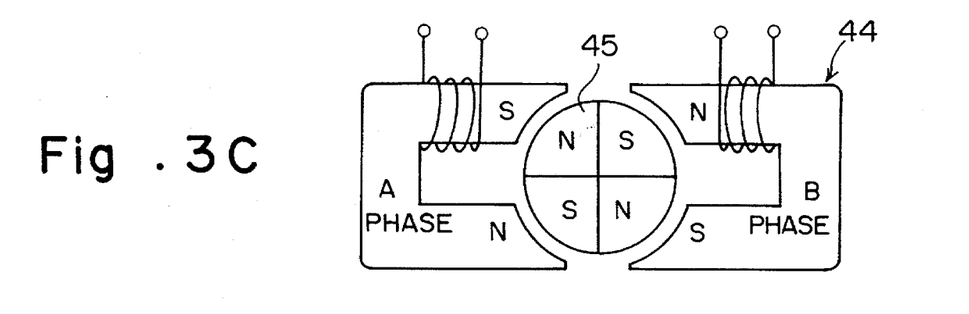
Figure 3D:
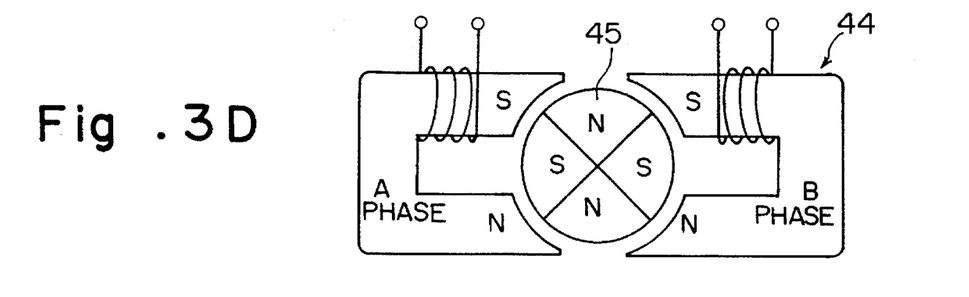

A lens barrel storage control apparatus according to the present invention for retracting the lens barrel 4 of such zoom system 2 to a retracted position or collapsed position is mainly constructed with a one-chip type microcomputer (referred to as "CPU" in this specification and the attached drawings) 40, as shown in FIG. 2. The DC motor 42 for driving the front lens group 22 or the lens barrel 4 and the stepping motor 44 for driving the rear lens group 28 are connected to CPU 40 through a logic driver circuit 46. The logic driver circuit 46 can control rotation and brake of the DC motor 42 by properly applying a high voltage or a low voltage to the DC motor 42 in accordance with a signal from CPU 40. Also, CPU 40 generates pulse signals to the stepping motor 44 in accordance with an energization pattern as shown in the below table, so that A phase and B phase of stepping motor 44 can be suitably energized.

In the below table, a rear lens group pointer (RLG pointer) is RAM data, and CPU 40 energizes the phases of stepping motor 44 in an energization pattern depending upon a value of RLG pointer to move the rear lens group 28 to a next phase. FIGS. 3A to 3D are conceptual drawings to show the structure and operation of stepping motor 44 used in the camera in the present embodiment. In FIGS. 3A to 3D show states of RLG pointers "0" to "3", respectively. As seen from FIGS. 3A to 3D, if pulse signals are output in such a cyclic pattern that the value of RLG pointer increases point by point from "0" to "3" and again returns to "0", a rotator 45 of stepping motor 44 normally rotates to move the rear lens group 28 backward, i.e., in the direction to leave the front lens group 22. Also, with pulse signals in such a cyclic pattern that the value of RLG pointer decreases point by point from "3" to "0" and again returns to "3", the stepping motor 44 is reversely rotated to move the rear lens group 28 forward.

TABLE 1

| RLG Pointer | Stepping Motor | |
| --- | --- | --- |
| | A Phase | B Phase |
| 0 | Normal | Normal |
| 1 | Normal | Reverse |
| 2 | Reverse | Reverse |
| 3 | Reverse | Normal |

Also, a switch section 48 is connected to CPU 40. The switch section 48 includes a main switch (SM), a back lid switch (SB), release switches (SP1, SP2) interlocked with a shutter button, a self timer switch (SSELF), a strobe mode switch (SMODE), a forcible rewind switch (SMR), an INF switch (SINF) for shooting of distant view, a zoom switch (STELE) for zooming to the telephoto side, a zoom switch (SWIDE) for zooming to the wide-angle side, etc., on/off signals of which are supplied to CPU 40.

Further connected to CPU 40 are a position sensor 24 for detecting a position of the front lens group 22 and a home position sensor 36 for detecting the home position of the rear lens group 28.

Further, a battery 50 is connected to CPU 40 through a regulator circuit (REG circuit) 52. The battery 50 also functions as a drive power source for zoom system 2. Also, a battery check circuit (BC circuit) 54 is connected to the battery 50 to perform battery check, for example to check a voltage of battery 50, by a control signal from CPU 40 and to supply information of the check to CPU 40.

Next described along the flowcharts in FIG. 4 to FIG. 8 is a control in retracting the lens barrel, as executed by CPU 40 in the above arrangement.

Figure 4:
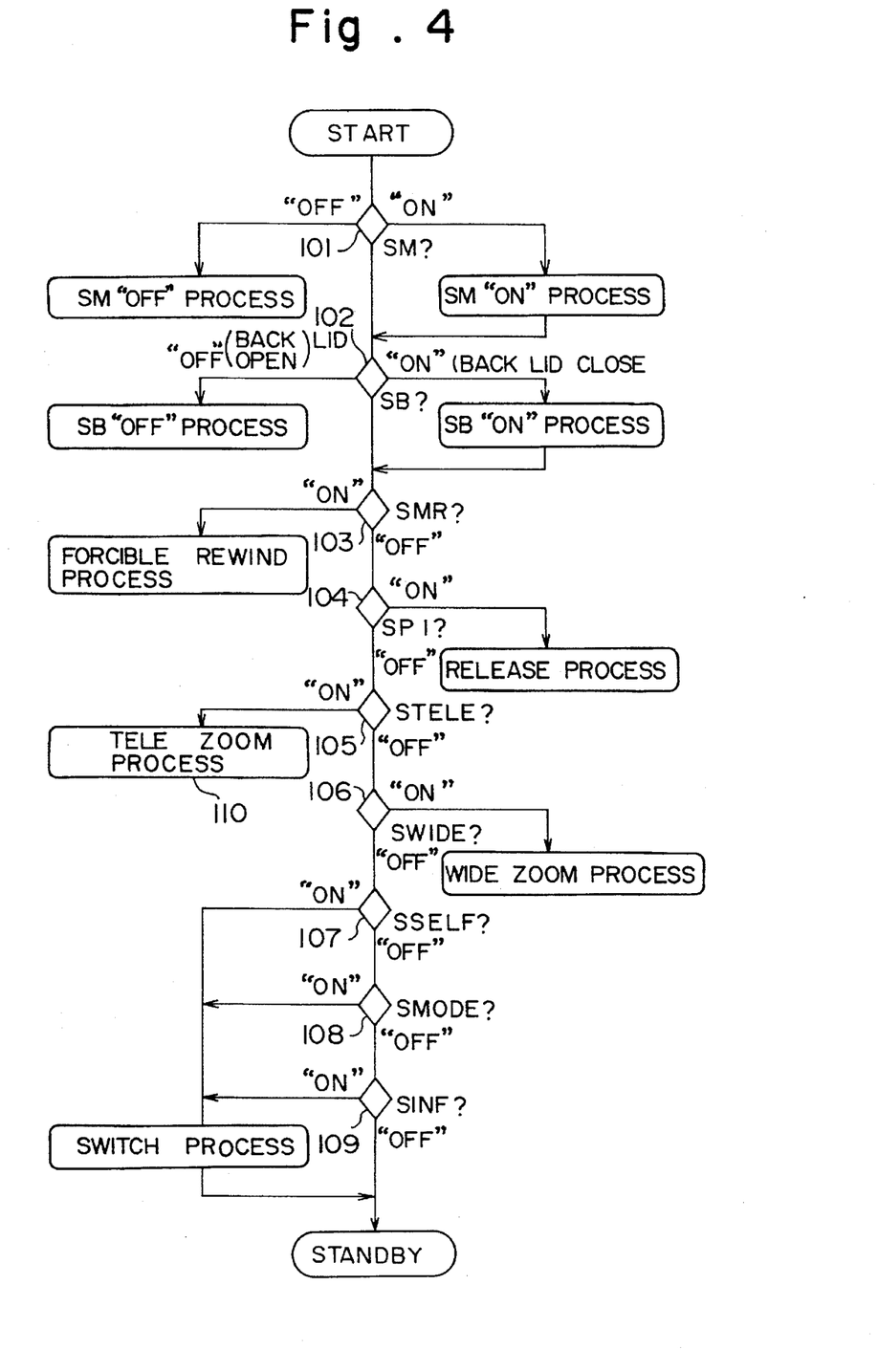
FIG. 4 is a flowchart to show an embodiment of processes before the camera reaches a standby state.

First, FIG. 4 is a flowchart between loading of film into the camera and a standby state (photographable state). Namely, sequential decisions are made as to if the main switch (SM) is turned on (Step 101), if the back lid switch (SB) is turned on after the back lid is closed (Step 102), if the forcible rewind switch (SMR) is off (Step 103), if the shutter button is not pressed while keeping the release switch (SP1) off (Step 104), if the telephoto zoom switch (STELE) is kept off (Step 105), if the wide-angle zoom switch (SWIDE) is kept off (Step 106), the self timer switch (SSELF) is off (Step 107), if the strobe mode switch (SMODE) is off (Step 108), and if the INF switch (SINF) is off (Step 109). If the above conditions all are satisfied, the camera goes into a standby state. Once the camera goes into the standby state, Step 101 to Step 109 are repeated.

With the camera in the standby state, the lens barrel 4 of zoom system 2 is located between the position in the extreme telephoto state shown in FIG. 1A and the position in the extreme wide-angle state shown in FIG. 1B. A process to retract the lens barrel 4 to the retracted position in the camera body is started if the main switch (SM) is turned off or if the camera is not operated for a certain time period. The following description concerns a process executed when the main switch (SM) is turned off. The retracted position of lens barrel 4 in the present embodiment is a position where the moving barrel 10 and the intermediate barrel 8 are further retracted from the position in the extreme wide-angle state shown in FIG. 1B into the stationary barrel 6.

Figure 5A:
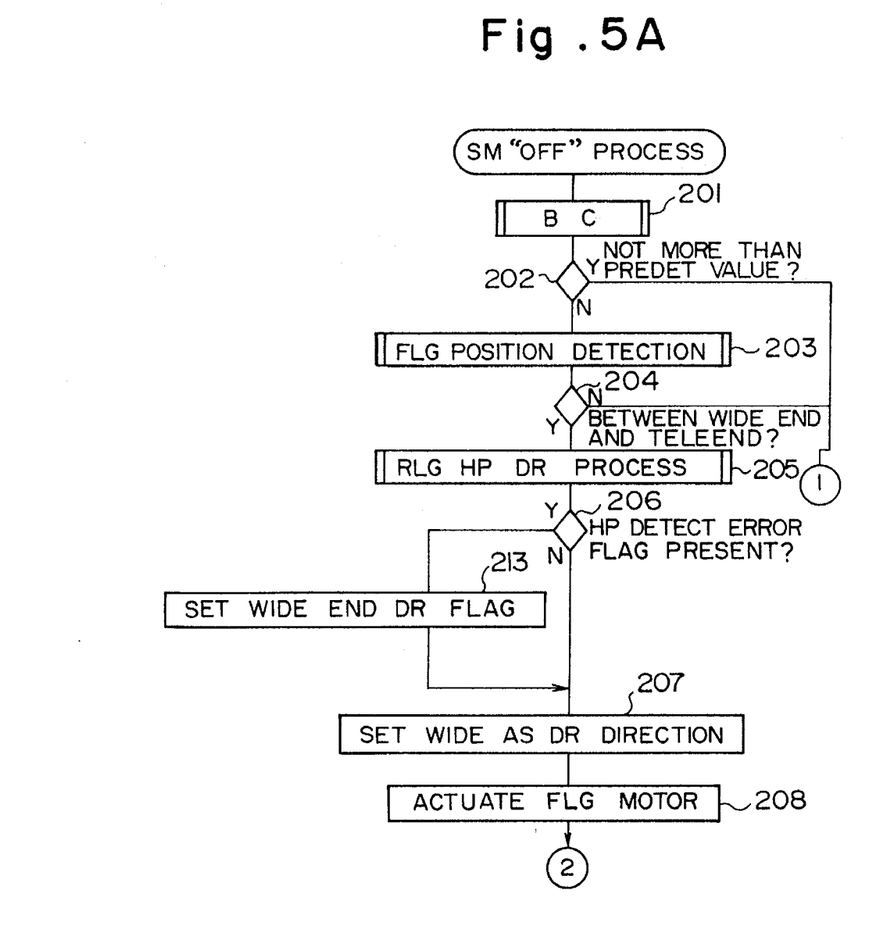
FIGS. 5A and 5B are flowcharts to show an embodiment of SM "OFF" process executed by the lens barrel storage control apparatus of the present invention.
Figure 5B:
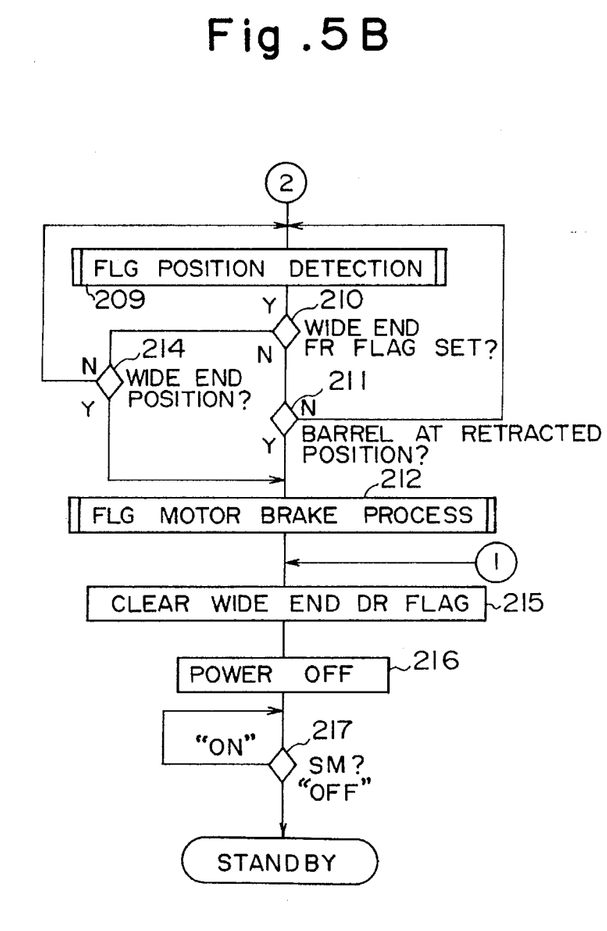

In the SM "OFF" process, as shown in FIGS. 5A and 5B, a battery check (BC) process is first executed to measure a voltage of battery 50 (Step 201) and a decision is made as to if the voltage is not more than a predetermined value (Step 202). If the voltage is not more than the predetermined value, the flow proceeds to Steps 215 to 217 to end this process.

If the voltage of battery 50 is higher than the predetermined value, that is, if the decision is that the voltage is within a normal range, a position of the front lens group 22 is detected from a signal from the position sensor 24 (Step 203). If a decision at Step 204 is that the position of the front lens group 22 is out of a range between a wide-angle (WIDE) end inclusive and a telephoto (TELE) end, the flow proceeds to Steps 215 to 217 to end the process.

If the front lens group 22 is located between the WIDE end and the TELE end, an RLG HP drive process is executed for moving the rear lens group 28 to the home position (Step 205).

Figures 6A, 6B:
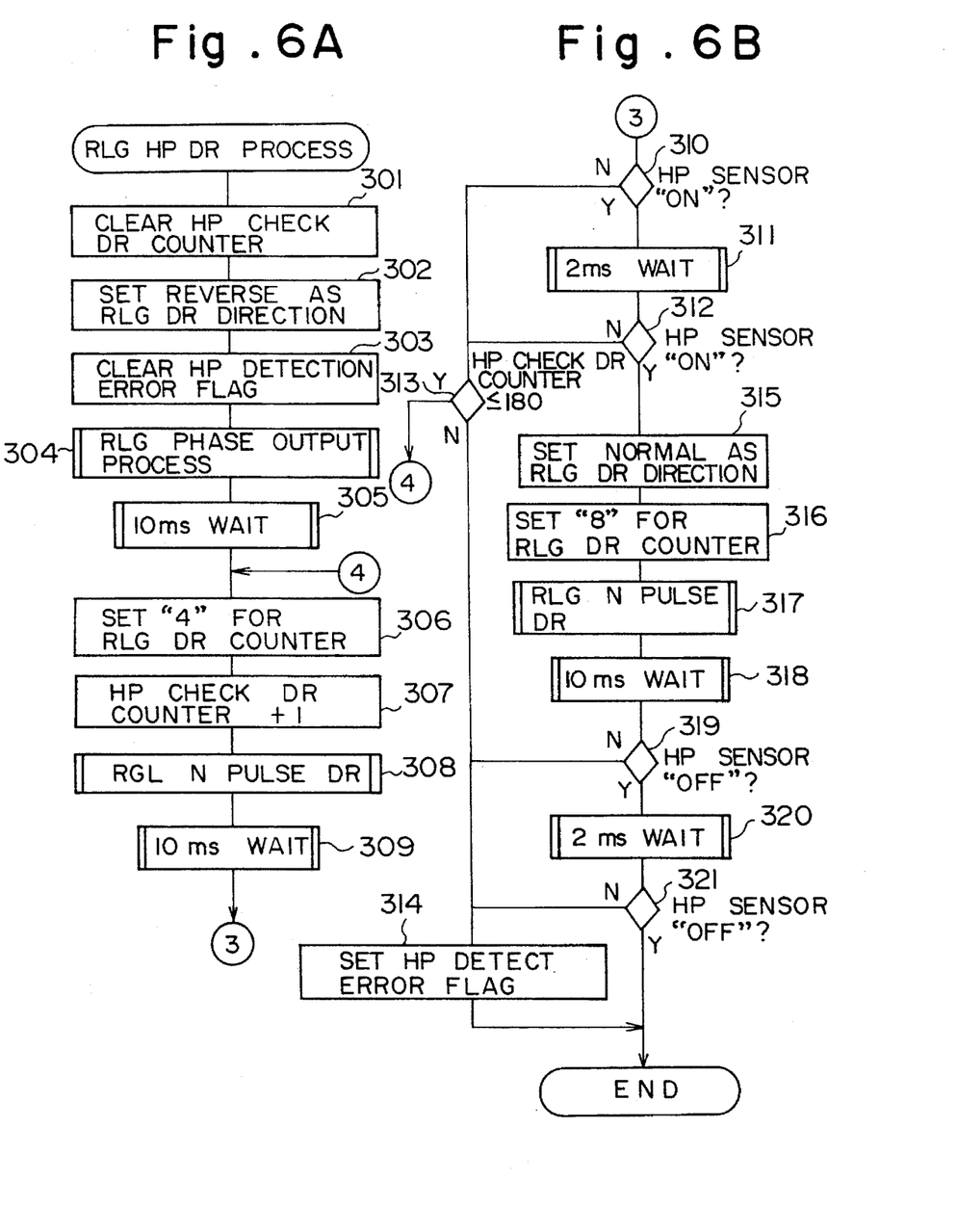
FIGS. 6A and 6B are flowcharts to show an embodiment of RLG HP drive process executed by the lens barrel storage control apparatus of the present invention.

As seen from FIGS. 6A and 6B, the RLG HP drive process is a process in which the rear lens group 28 is moved to the home position, and if the limit switch as the home position sensor is not turned on, an HP detection error flag is set under an assumption that there is something abnormal. This process will be described in more detail along FIGS. 6A and 6B.

A first step clears an HP check drive counter indicating a number of times of drive processes applied to the stepping motor 44 for driving the rear lens group 28 (RLG N pulse drive processes) (Step 301), and the drive direction or rotation direction of stepping motor 44 is set to the reverse direction in order to drive the rear lens group 28 toward the front lens group 22, i.e. , forward (Step 302). The HP detection error flag is also cleared for caution's sake (Step 303).

Figure 7:
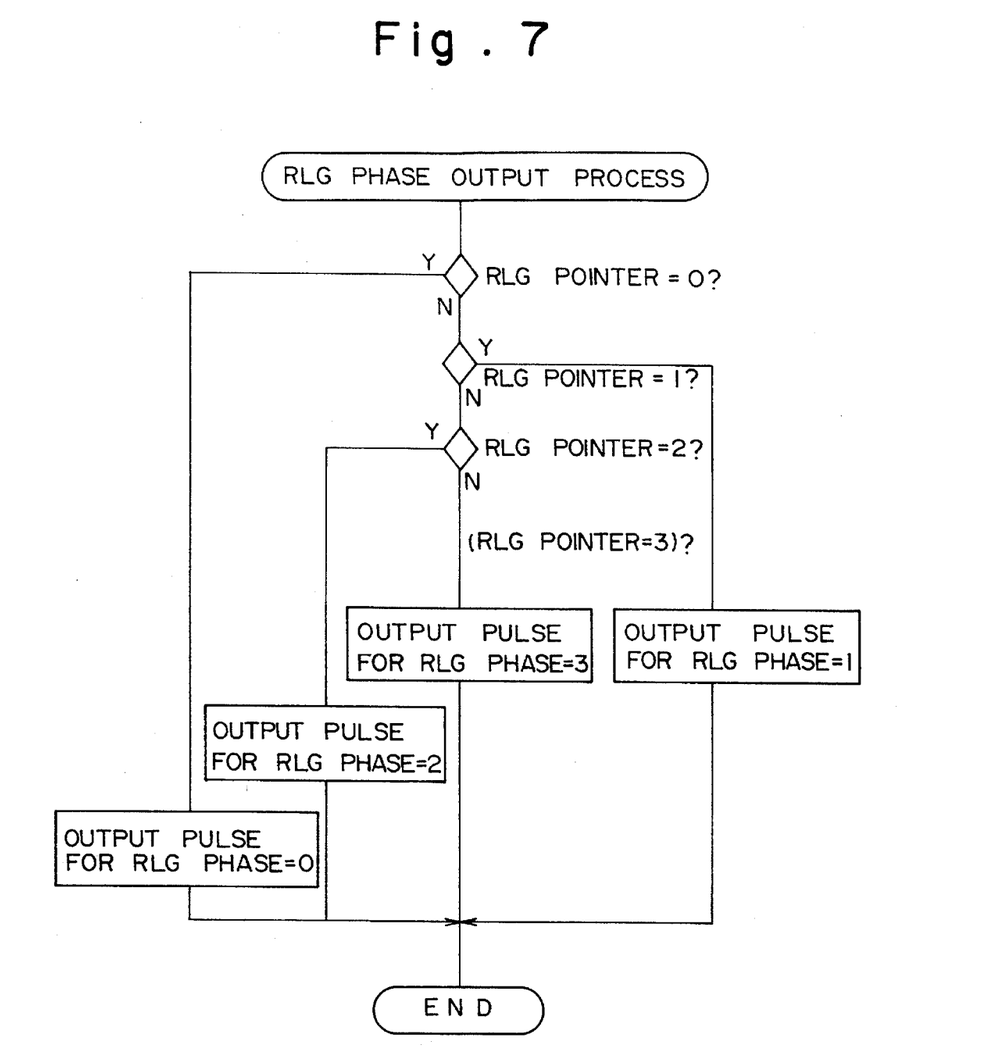
FIG. 7 is a flowchart to show an embodiment of RLG phase output process executed by the lens barrel storage control apparatus of the present invention.

Next, an RLG phase output process is carried out to energize the stepping motor 44 with phases according to a value of RLG pointer (Step 304). The RLG phase output process is a process as shown in FIG. 7, in which a predetermined pulse signal is output to achieve a phase of stepping motor 44 (see FIGS. 3A to 3D) according to the value of RLG pointer. At next Step 305 a wait time of constant time, about 10 ms in the present embodiment, is given to stabilize the energization state of stepping motor 44.

Subsequent steps are a process for driving the stepping motor 44 by N pulses (Steps 306 to 308). Here, N represents a numerical value set in the RLG drive counter at Step 306. Accordingly, since "4" is set in the RLG drive counter in this process, the stepping motor 44 is driven by four pulses so as to move the rear lens group 28 forward by a distance corresponding thereto.

Figure 8:
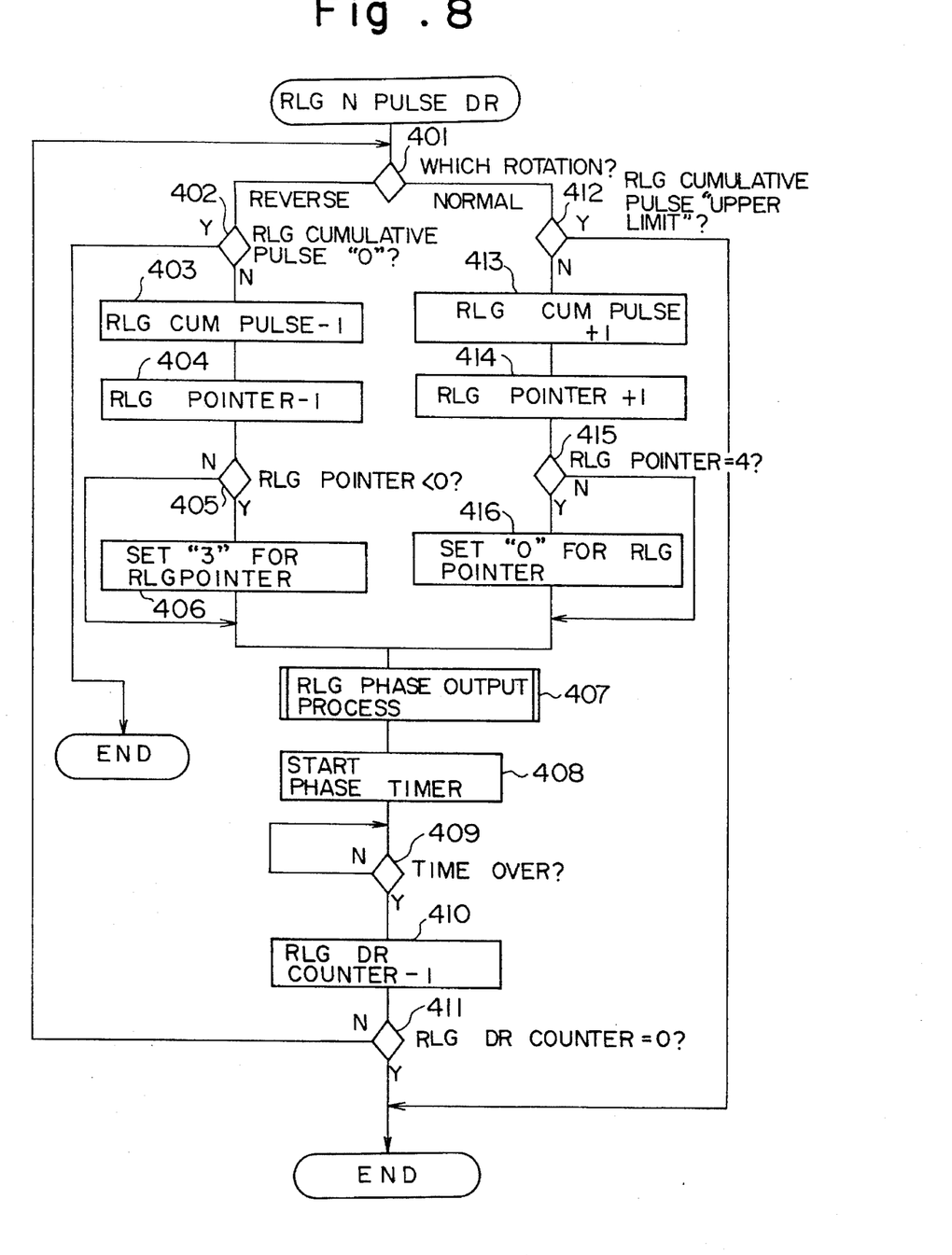
FIG. 8 is a flowchart to show an embodiment of RLG N pulse drive process executed by the lens barrel storage control apparatus of the present invention.

The details of the process at Step 308 are shown in the flowchart in FIG. 8. In this process, the driving direction of stepping motor 44 is first set to the reverse direction, and then the flow goes from Step 401 to Step 402. If the RLG cumulative pulse number corresponding to the position of the rear lens group 28 is "0", this process is ended under a judgement that the rear lens group 28 is located at the home position and further forward movement is impossible.

On the other hand, if the RLG cumulative pulse number is not less than "1", "1" is preliminarily subtracted from the RLG cumulative pulse number, because the rear lens group 28 will be fed forward by one pulse (Step 403). Next, "1" is subtracted from a value of RLG pointer corresponding to a current phase of stepping motor 44 (Step 404), and the stepping motor 44 will be driven to a next phase at later Step 407. In case a value of RLG pointer is negative, "3" is set as the value of RLG pointer (Steps 405 and 406).

When a pulse signal according to the value of RLG pointer is output at Step 407, the rotator 45 of stepping motor 44 is reversed by one pulse, as described above, to move the rear lens group 28 forward. Then the flow waits before a certain time elapses (Steps 408, 409) and thereafter "1" is subtracted from the value of RLG drive counter (Step 410). In this case, since "4" is initially set in the RLG drive counter, above Steps 401 to 410 are repeated four times and the process is finished when the value of RLG drive counter reaches "0" (Step 411). As a result, the stepping motor 44 is driven by four pulses in the reverse direction.

After the RLG N pulse drive process is ended, an on or off condition of the home position sensor 36 is detected after 10 ms elapses (Steps 309 to 312). The present embodiment is arranged, taking a possibility of error operation into consideration, such that the on or off condition of the home position sensor 36 is again detected 2 ms after first on detection of the home position sensor 36.

If the home position sensor 36 is off, a decision is made as to if a value of HP check drive counter is not more than "180" (Step 313). "1" is added to the HP check drive counter every drive of four pulses of the stepping motor 44 (Step 307). In case the value of this counter is not more than "180", there is a possibility that the rear lens group 28 has not reached the home position yet. This is because 720 pulse signals (180 counters) must be sent to the stepping motor 44 in order to move the rear lens group 28 from the most distant position from the home position, to the home position. If the home position sensor 36 is off and if the HP check drive counter is not more than "180", it can be considered that the rear lens group 28 has not reached the home position yet, and therefore Steps 306 to 312 are repeated. Then, if the home position sensor 36 is off and if the HP check drive counter exceeds "180", an HP detection error flag is set under an assumption that there is something abnormal in drive of the rear lens group 28 (Step 314), and the flow leaves this process.

On the other hand, if the value of HP check drive counter is within "180" and if the home position sensor 36 is turned on, the rear lens group 28 is moved to the standby position which is away from the home position to the camera body by several pulses. Here, suppose the rear lens group 28 is moved eight pulses. First, the drive direction of stepping motor 44 is set to the normal rotation direction (Step 315) and "8" is set in the RLG drive counter (Step 316). Then, the RLG N pulse drive process is executed (Step 317) and thereafter the flow waits about 10 ms to stabilize the energization state of stepping motor 44 (Step 318). In the RLG N pulse drive process, the flow goes from Step 401 to Step 412 in FIG. 8 to repeat Steps 401 to 411 eight times.

When the rear lens group 28 is moved to the standby position as described, the home position sensor 36 is turned off if there is nothing abnormal. However, if the home position sensor 36 is still kept on even after the double on or off detections of the home position sensor 36 (Steps 319 to 321), an HP detection error flag is set under an assumption that there is something abnormal (Step 314).

If the home position sensor 36 is off at Steps 319 to 321, which is normal, the flow leaves the RLG HP drive process without setting an HP detection error flag.

If the rear lens group 28 is normally driven in the RLG HP drive process, the rear lens group 28 should be located at the standby position near the home position. A positional relation between the rear lens group 28 at the standby position and the front lens group 22 is approximately the state as shown in FIG. 1A, in which the rear lens group 28 is stored before the rear end of the moving barrel 10. Accordingly, when the lens barrel 4 is retracted to the retracted position while maintaining this positional state of the front and rear lens groups 22, 28, the rear lens group 28 will never contact the film F.

The lens barrel retracting process is next described along FIGS. 5A and 5B. First, a decision is made at Step 206 as to if an HP detection error flag is set. Since there is no HP detection error flag set as long as the drive of the rear lens group 28 is normal, the drive direction of the front lens group 22 is set to the wide-angle (WIDE) in order to retract the lens barrel 4 to the retracted position (Step 207), and then the DC motor (FLG motor) 42 is driven (Step 208). While the DC motor 42 is driven in the set direction, the moving barrel 10 and the intermediate barrel 8 are retracted into the stationary barrel 6. During the retraction of the lens barrel 4, the position sensor 24 detects a position of the front lens group 22, which is a position of lens barrel 4 (Step 209), and when the lens barrel 4 reaches the retracted position (Step 211), a brake is applied to the DC motor 42 (Step 212).

On the other hand, if the HP detection error flag is set with an anomaly found in the RLG HP drive process, the flow proceeds from Step 206 to Step 213 to set a WIDE end drive flag. With this flag set, the DC motor 42 is driven to retract the lens barrel 4 similarly as in the above process (Steps 207, 208), and when the front lens group 22 reaches the wide-angle (WIDE) end (Steps 210, 214), a brake is applied to the DC motor 42 (Step 212).

As described above, the front lens group 22 stops at the position of WIDE end as shown in FIG. 1B, if there is something abnormal in drive of the rear lens group 28 or in the home position sensor 36. As seen from FIG. 1B, the rear lens group 28 will never contact the film F in this state even if it is located closest to the camera body.

After that, the WIDE end drive flag is cleared (Step 215), the drive power source for zoom system 2 is turned off (Step 216), it is checked if the main switch (SM) is off (Step 217), and the process is ended.

Although the above embodiment is so arranged that with an anomaly the retraction is stopped when the front lens group 22 reaches the WIDE end, in order to minimize a projection amount of lens barrel 4, it can be stopped at any position within a photographable range while preventing the rear lens group 28 from contacting the film F.

The preferred embodiment of the present invention was described above in detail, but it is needless to say that the present invention is not limited to the above embodiment.

For example, the above embodiment is so arranged that the standby position is a position several pulses away from the home position, but the standby position may be any position where no interference occurs between the rear lens group 28 and the film F when the lens barrel 4 is stored at the retracted position.

Also, the lens barrel 4 of zoom system 2 in the above embodiment is of the three barrel arrangement composed of the stationary barrel 6, the intermediate barrel 8 and the moving barrel 10, but the present invention can be applied to a two barrel structure composed of a stationary barrel and a moving barrel.

As described above, the apparatus according to the present invention is so arranged that if the position of rear lens group 28 is lost with some anomaly occurring in drive of rear lens group 28, the lens barrel 4 is not retracted to the retracted position in the camera body 7 but is located at a position in a photographable state. When the lens barrel 4 is located at the position in the photographable state, the rear lens group 28 will never contact the film F, which can prevent the film F, the rear lens group 28 or other camera constructional elements from being damaged in retracting the lens barrel 4.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A camera comprising:

a camera body;

a lens barrel arranged as movable backward and forward relative to said camera body;

a first motor for driving said lens barrel;

a front lens group coaxially mounted in a front end portion of said lens barrel;

a rear lens group coaxially disposed in said lens barrel behind said front lens group so as to be independently movable backward and forward;

a second motor for driving said rear lens group; and a lens barrel storage control apparatus for controlling said first motor and said second motor in storing said lens barrel at a retracted position in said camera body, said lens barrel storage control apparatus including first means for driving said second motor to locate said rear lens group at a predetermined standby position in said lens barrel, second means for detecting if said rear lens group is located at said standby position, third means for driving said first motor to retract said lens barrel to the retracted position in said camera body while keeping said rear lens group at said standby position when said second means detects that said rear lens group is located at said standby position, and fourth means for driving said first motor to locate said lens barrel at a suitable position within a range where said lens barrel can be set in a photographable state when said second means detects that said rear lens group is not located at said standby position.

2. A camera according to claim 1, wherein said standby position is a home position where said rear lens group is located closest to the front lens group.

3. A camera according to claim 2, wherein said second means is a position sensor for detecting if said rear lens group is located at said home position.

4. A camera according to claim 1, wherein said standby position is a position which is at predetermined distance backward from a home position where said rear lens group is located closest to the front lens group.

5. A camera according to claim 4, wherein said second means is a position sensor for detecting if said rear lens group is located at said home position.

6. A camera according to claim 1, wherein said suitable position of said lens barrel by said fourth means is a position where said lens barrel is located at a shortest focal length.

7. A camera according to claim 1, wherein said lens barrel is of a telescopic structure.

8. A camera according to claim 1, wherein said first motor is a direct current motor.

9. A camera according to claim 1, wherein said second motor is a stepping motor.

10. A lens barrel storage control apparatus for use in a camera having a camera body, a lens barrel arranged as movable backward and forward relative to said camera body, a first motor for driving said lens barrel, a front lens group coaxially mounted in a front end portion of said lens barrel, a rear lens group coaxially disposed in said lens barrel behind said front lens group so as to be independently movable backward and forward, and a second motor for driving said rear lens group, said lens barrel storage control apparatus for controlling said first motor and said second motor in storing said lens barrel at a retracted position in said camera body, comprising:

first means for driving said second motor to locate said rear lens group at a predetermined standby position in said lens barrel;

second means for detecting if said rear lens group is located at said standby position;

third means for driving said first motor to retract said lens barrel to the retracted position in said camera body while keeping said rear lens group at said standby position, when said second means detects that said rear lens group is located at said standby position; and fourth means for driving said first motor to locate said lens barrel at a suitable position within a range where said lens barrel can be set in a photographable state, when said second means detects that said rear lens group is not located at said standby position.

11. A lens barrel storage control apparatus according to claim 10, wherein said standby position is a home position where said rear lens group is located closest to the front lens group.

12. A lens barrel storage control apparatus according to claim 11, wherein said second means is a position sensor for detecting if said rear lens group is located at said home position.

13. A lens barrel storage control apparatus according to claim 10, wherein said standby position is a position which is at predetermined distance backward from a home position where said rear lens group is located closest to the front lens group.

14. A lens barrel storage control apparatus according to claim 13, wherein said second means is a position sensor for detecting if said rear lens group is located at said home position.

15. A lens barrel storage control apparatus according to claim 10, wherein said suitable position of said lens barrel by said fourth means is a position where said lens barrel is located at a shortest focal length 16. A lens barrel storage control method for use in a camera having a camera body, a lens barrel arranged as movable backward and forward relative to said camera body, a first motor for driving said lens barrel, a front lens group coaxially mounted in a front end portion of said lens barrel, a rear lens group coaxially disposed in said lens barrel behind said front lens group so as to be independently movable backward and forward, and a second motor for driving said rear lens group, said lens barrel storage control method comprising the steps of:

driving said second motor to locate said rear lens group at a predetermined standby position in said lens barrel on starting a process for storing said lens barrel at a retracted position in said camera body;

detecting if said rear lens group is located at said standby position;

driving said first motor to retract said lens barrel to the retracted position in said camera body while keeping said rear lens group at said standby position, when said second means detects that said rear lens group is located at said standby position; and driving said first motor to locate said lens barrel at a suitable position within a range where said lens barrel can be set in a photographable state, when said second means detects that said rear lens group is not located at said standby position.

17. A lens barrel storage control method according to claim 16, wherein said standby position is a home position where said rear lens group is located closest to the front lens group.

18. A lens barrel storage control method according to claim 16, wherein said standby position is a position which is at predetermined distance backward from a home position where said rear lens group is located closest to the front lens group.

19. A lens barrel storage control method according to claim 16, wherein said suitable position of said lens barrel by said fourth means is a position where said lens barrel is located at a shortest focal length.

* * * * *